(12) United States Patent
Gorlich et al.

(10) Patent No.: US 8,469,312 B2
(45) Date of Patent: Jun. 25, 2013

(54) INTEGRATED MAINTENANCE STEP ON HELICOPTER FUSELAGE

(75) Inventors: Stefan Gorlich, Donauworth (DE);
Gabriela Mihalascu, Burgheim (DE);
Klaus Koppel, Asbach-Baumenheim (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 169 days.

(21) Appl. No.: 13/089,428

(22) Filed: Apr. 19, 2011

(65) Prior Publication Data

US 2011/0272524 A1    Nov. 10, 2011

(30) Foreign Application Priority Data

May 10, 2010  (EP) ..................... 10400029

(51) Int. Cl.
*B64C 1/24*  (2006.01)
(52) U.S. Cl.
USPC ........... 244/129.6; 244/17.11; 280/163
(58) Field of Classification Search
USPC ........... 244/129.6, 119, 129.1, 117 R, 17.11;
280/163, 166; 105/447
See application file for complete search history.

(56) References Cited

U.S. PATENT DOCUMENTS

| | | | |
|---|---|---|---|
| 2,158,949 A | 5/1939 | Sarles | |
| 2,417,987 A | 3/1947 | McFarland | |
| 2,494,367 A | 1/1950 | Steele | |
| 2,647,677 A * | 8/1953 | Reed | 182/88 |
| 2,951,454 A * | 9/1960 | Candlin, Jr. | 105/447 |
| 2,990,148 A | 6/1961 | James | |
| 3,904,155 A * | 9/1975 | Chavis | 244/118.1 |
| 3,986,503 A | 10/1976 | Le Guillon | |
| 4,050,208 A * | 9/1977 | Pompei et al. | 52/460 |
| 4,116,457 A * | 9/1978 | Nerem et al. | 280/166 |
| 4,440,364 A * | 4/1984 | Cone et al. | 244/129.6 |
| D287,714 S * | 1/1987 | Short | D12/345 |
| 4,836,568 A * | 6/1989 | Preslik et al. | 280/164.1 |
| 7,566,064 B2 * | 7/2009 | Leitner et al. | 280/166 |
| 8,157,277 B2 * | 4/2012 | Leitner et al. | 280/166 |
| 8,196,865 B2 * | 6/2012 | Martin | 244/129.6 |
| 2009/0078827 A1 | 3/2009 | Martin | |

FOREIGN PATENT DOCUMENTS

DE   102007022279 A1   11/2008
EP       1571042 A1    7/2005

OTHER PUBLICATIONS

Search Report and Written Opinion; Application No. EP 10400029 dated; Oct. 1, 2010.

* cited by examiner

*Primary Examiner* — Benjamin P Lee
(74) *Attorney, Agent, or Firm* — Brooks Kushman P.C.

(57) ABSTRACT

Maintenance steps on helicopters (10) comprising a casing (1), integrated into a lateral shell of a fuselage of a helicopter (11) for access from outside and a step (2) being pivotably mounted in the casing (1). The invention relates as well to methods for mounting and dismounting of such maintenance steps.

19 Claims, 1 Drawing Sheet

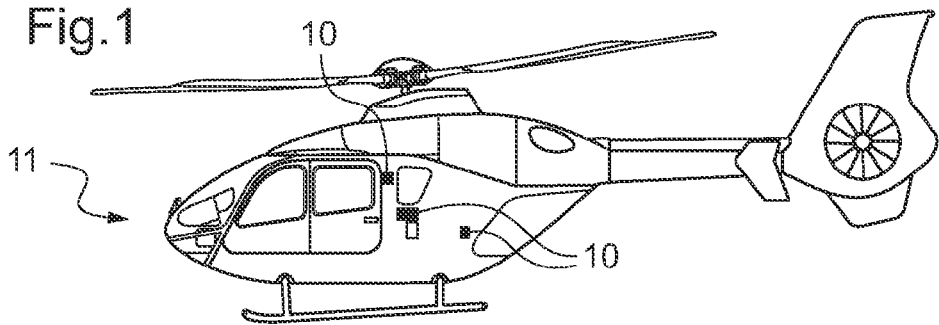
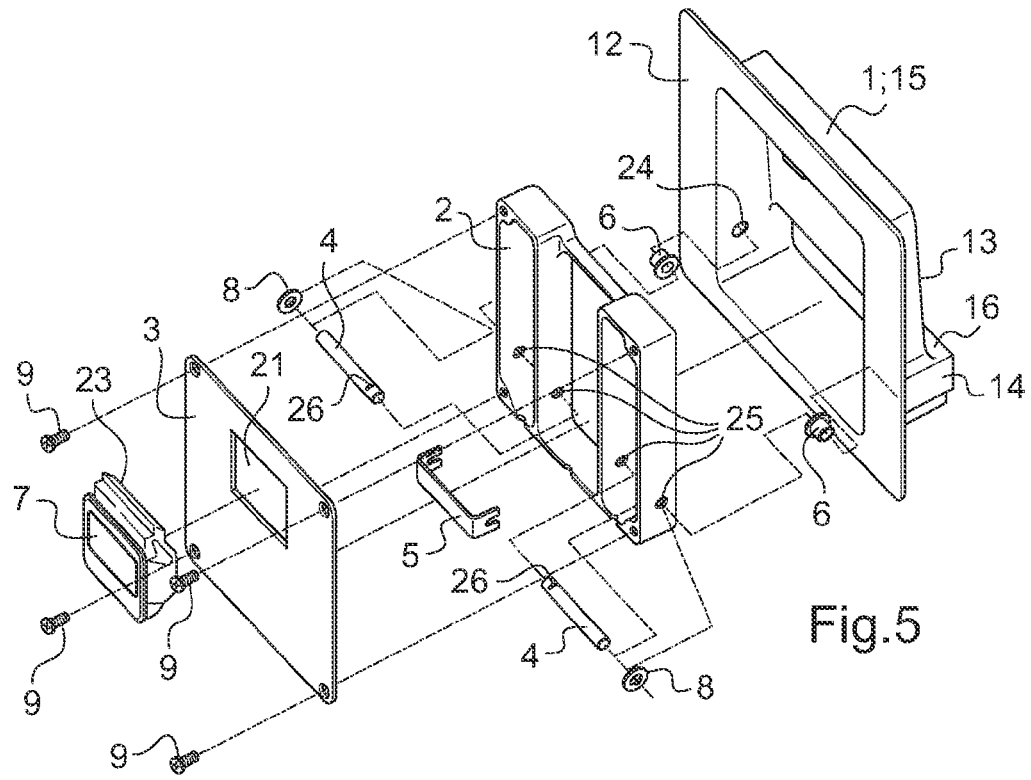

INTEGRATED MAINTENANCE STEP ON HELICOPTER FUSELAGE

CROSS REFERENCE TO RELATED APPLICATIONS

This application claims the benefit of EP 10 400 029.4 filed on May 10, 2010, the disclosure of which is incorporated in its entirety by reference herein.

BACKGROUND OF THE INVENTION (1) Field of the Invention

The invention relates to maintenance steps on helicopter fuselage according to the preamble of claim 1, a method for mounting of such maintenance steps according to the preamble of claim 9 and a method for dismounting of such maintenance steps according to the preamble of claim 13.

(2) Description of Related Art

Maintenance steps are present on principally all helicopters, for example in different numbers such as 3 per side for EC135, 3 per side for EC145 or more for NH90. Maintenance steps are used to allow the maintenance crew to get in a position where they can fulfil their maintenance tasks, especially for checks at the engines and main gear box. Maintenance steps are always located outside the helicopters, namely in the lateral shell of the helicopters. Those steps are in general part of the fuselage, but when flying they are hidden and retracted.

US 2009078827 A1 discloses a foldable step unit for a rotorcraft, the step unit being provided with a bottom step and a stationary support that is secured to the structure of the rotorcraft. The step unit comprises a left side beam and a right beam hinged on said stationary support, said bottom step being arranged on a left free end and a right free end respectively of the left and right side beams via a pivot pin, drive means for said step unit are connected via at least one control means to at least one side beam and enable said step unit to be retracted into and extended from a housing formed in the rotorcraft. This state of the art discloses a foldable step for a helicopter, but not used for maintenance but rather for passengers to enter or exit the aircraft with corresponding high demands as to safety, subsequent high complexity and thus increases maintenance needs. As well the steps or stairs disclosed in U.S. Pat. No. 2,494,367, U.S. Pat. No. 2,647,677 or U.S. Pat. No. 2,990,148 are all dedicated to give access to the inside of an aircraft and are therefore subject to different concepts of safety and operation than a maintenance step.

DE 102007022279 A1 discloses a vehicle chassis which surrounds an auxiliary equipment compartment. A step recess forms a section of the boundary of the auxiliary equipment compartment. To simplify the service and maintenance of the industrial truck, the step recess has a service and maintenance opening which can be closed by a service and maintenance cover, through which opening the auxiliary equipment compartment can be accessed. A step recess is not appropriate for an aircraft with its need of a smooth outside profile of the fuselage.

A general trend in aerospace is to reduce the direct maintenance costs. This can be done for helicopters by giving easy access from outside to all maintenance related components. A disadvantage of known maintenance steps of helicopters is that they can only be installed or replaced where access from inside is possible. Consequently the maintenance steps of the state of the art are hardly removable and in any case only from inside the helicopter, e.g. an access from inside to the bearing sleeves or bearing pins of the maintenance step is necessary for exchange of a maintenance step, i.e. it is mandatory to remove the internal carpeting. Sometimes the exchange is even impossible without removing a whole part of the fuselage. Supplemental to reduced direct maintenance costs the requests from electric installation design of the EC135 have as a consequence the request, to reduce the size of the maintenance steps in order to have more free space for harness installation inside the helicopter fuselage.

SUMMARY OF THE INVENTION

The object of the invention is to provide maintenance steps of a helicopter allowing their easy replacement and/or repair, a method for mounting of such maintenance steps and a method for dismounting of such maintenance steps.

The solution according to the invention is provided with a maintenance step with the features of claim 1, a method for mounting of such maintenance steps with the features of claim 9 and a method for dismounting of such maintenance steps with the features of claim 13.

According to the invention a maintenance step is provided comprising a casing integrated into a lateral shell of a fuselage of a helicopter for access from outside. A step is pivotably mounted in the casing. The casing is provided with an essentially rectangular frame and a rearward extension with lateral sides, said rearward extension with lateral sides being integrated into the lateral shell of the fuselage of the helicopter. The lateral sides have coaxial borings preferably for bearings and the step is provided with corresponding coaxial borings in lateral flanges. Two pins are provided for insertion through the corresponding coaxial borings into the coaxial borings in the lateral sides of the rearward extension for pivotable mounting of the step in the casing and a retaining profile is provided for securing the inserted pins in their position. The key advantages of the inventive maintenance step are that it is exclusively mountable, demountable and operable from outside the helicopter, i.e. the inventive maintenance step can be totally installed/removed from outside without any need for access from inside the helicopter with less pieces and low complexity. The inventive maintenance step is easy to use for operation and safe locking while flying, it needs no interception into the helicopter structure because no plugging of any shafts in the internal helicopter fuselage is necessary. The inventive maintenance step has a flat design for reduced space requirement inside the helicopter. The inventive maintenance step provides modularity at minimum installation space for maximal use. A further advantage of the invention is to get more space available. The costs for the inventive maintenance step are decreasing at around −50%, as well as the weight at around −9%. The inventive maintenance step has a plastic locking device with little weight and not harming the external fuselage of the helicopter.

According to a preferred embodiment of the invention the maintenance step has a geometrically equivalent interface to said lateral shell allowing modular use for subsequent installation at a plurality of different existing helicopters.

According to a further preferred embodiment of the invention a backside of the rearward extension is formed with at least one overhang as a cost efficient support for the step.

According to a further preferred embodiment of the invention a full flat stepping area with anti-skid painting is provided on the surface of the step for improved safety during maintenance.

According to a further preferred embodiment of the invention a step cover is mounted to the step by at least one safety screw to provide for the step in its closed position a smooth surface in alignment with the shell of the fuselage of the helicopter.

According to a further preferred embodiment of the invention the step cover is provided with an opening for a lock to easily fix the step in its closed position inside the fuselage.

According to a further preferred embodiment of the invention wear resistant bearings are provided for insertion into the borings of the lateral sides of the rearward extension of the casing. The wear resistant bearings hold the pins of the step and—preferably together with washers at the inside of the lateral sides and coaxially with the bearings—need no replacement during common life cycles of a helicopter. No more than a boring is provided in the step as the retaining profile prevents the pins from rotating relative to the lateral sides of the step.

According to a preferred embodiment of the invention a method for mounting of a maintenance step is provided with the steps of: inserting the rearward extension of the essentially rectangular casing of the maintenance step into the prepared fuselage of the helicopter, riveting the essentially rectangular frame of the casing flat against the lateral shell of the prepared fuselage of the helicopter, mounting of bearings into coaxial borings in the lateral sides of the rearward extension of the essentially rectangular casing, inserting pins from within the mid box through the corresponding coaxial borings into the coaxial borings in the lateral sides of the rearward extension and clipping the retaining profile into the grooves at the inwardly pointing ends of the inserted pins to fix the pins in their position. The retaining profile is held in its clipped position by the step cover biased against the retaining profile after screwing of the step cover to the step. The assembly is particularly simple, fast and leads to a highly reliable maintenance step.

According to a further preferred embodiment of the invention washers, preferably distance washers, are arranged inside the lateral sides and coaxially with the bearings before insertion of the pins for low friction.

According to a further preferred embodiment of the invention the surface opposite the full flat stepping area of step is provided with a step cover screwed with safety screws for a smooth surface in alignment with the lateral shell of the outer fuselage of the helicopter.

According to a preferred embodiment of the invention a method is provided for dismounting of a maintenance step with the following steps: unscrewing and removing the step cover from the step if applicable, withdrawing the retaining profile from its clipped position, taking the retaining profile out of the grooves at the inwardly pointing ends of the inserted pins, removing the pins from their positions in the coaxial borings, and taking the step out of the prepared fuselage of the helicopter. Thus the complete step can be dismounted after removal of the retaining clips and displacement of both pins in the middle position.

BRIEF DESCRIPTION OF THE DRAWINGS

A preferred embodiment of the invention is presented below by means of the attached drawings.

FIG. 1 shows a schematic side view of a helicopter with an integrated maintenance step according to the invention, FIG. 2 shows a front view of a closed integrated maintenance step according to the invention, FIG. 3 shows a front view of an open integrated maintenance step according to the invention, FIG. 4 shows a partly cross sectional side view of a deployed maintenance step according to the invention and FIG. 5 shows an exploded view of an integrated maintenance step according to the invention.

DETAILED DESCRIPTION OF THE PREFERRED EMBODIMENTS

FIG. 1: A maintenance step 10 of a helicopter 11 is smoothly integrated into the lateral shell of said helicopter by riveting its essentially rectangular frame 12 to said lateral shell. The maintenance step 10 is provided with an interface that is geometrically equivalent to said lateral shell allowing modular use of the maintenance step 10 at suitable positions of lateral shells of different helicopters.

FIG. 2-5: The maintenance step 10 comprises an essentially rectangular casing 1 with a rearward extension. The rearward extension is provided with an inclined backside 13. The backside 13 is provided with an overhang 16 and results in a bottom 14 of the essentially rectangular casing 1 extending further rearward in the lower part of the backside 13 (see FIG. 4, 5). An abutment flange 28 is provided parallel to the frame 12 at a top 15 of the rearward extension.

An essentially rectangular step 2 fits into the essentially rectangular casing 1. The step 2 is provided with a mid box 17 and two aligned lateral boxes 18, 19 integral with each other. The mid box 17 is provided with a recess 20 along the side that is adjacent to the abutment flange 28 when the step 2 is inside the rectangular casing 1 in its closed position. A full flat stepping area 29 with anti-skid painting is provided on the surface of the step 2 that is adjacent to the rearward extension when the step 2 is inside the rectangular casing 1.

The essentially rectangular casing 1 is provided with two coaxial borings 24 in opposed lateral sides of the rearward extension. Lateral flanges of the mid box 17 and the two lateral boxes 18, 19 of the step 2 are provided with corresponding coaxial borings 25. Wear resistant bearings 6 are mounted into the coaxial borings 24. Two pins 4 are provided for insertion from the mid box 17 through the corresponding coaxial borings 25, through washers 8 into the coaxial borings 24 in the two opposed lateral sides of the rearward extension. A retaining profile 5 is provided for interaction with grooves 26 at inwardly pointing ends of the inserted pins 4 to fix the pins 4 in their respective positions.

A step cover 3 is mounted to the step 2 by 4 safety screws 9 into the corners of the step 2 opposite to the full flat stepping area 29 and holds the retaining profile 5 on the pins 4. An opening 21 is provided in the step cover 3 for mounting of a lock 7 to the step cover 3. Lateral grooves 22 of the lock 7 are shifted over the edges of the opening 21 to hold the lock 7 in the opening 21 of the step cover 3. A projection 23 of the lock 7 is conceived for preferably resilient interaction with the abutment flange 28 to lock the step 2 safely into the essentially rectangular casing 1 when the step 2 is in its closed position. The lock 7 is made of plastic.

Mounting of the Maintenance Step 10

The maintenance step 10 is mounted by riveting the essentially rectangular frame 12 of the essentially rectangular casing 1 flat against the lateral shell after inserting the rearward extension into the prepared fuselage of the helicopter 11.

The wear resistant bearings 6 are mounted into the respective coaxial borings 24 in either of the two lateral sides of the rearward extension of the essentially rectangular casing 1 and the washers 8 are arranged on the inside of the lateral sides and coaxially with the bearings 6. The two pins 4 are inserted from within the mid box 17 through the corresponding coaxial borings 25, through washers 8 into the coaxial borings 24 in the lateral sides of the rearward extension. After insertion of the two pins 4 on either side of the step 2 the retaining profile 5 is clipped into the grooves 26 at the inwardly pointing ends of the inserted pins 4 to fix the pins 4 in their position. The retaining profile 5 is held by the step cover 3 in its position. After that the step 2 can be pivoted relative to the essentially rectangular casing 1.

The lock 7 is inserted into the opening 21 of the step cover 3 and lateral grooves 22 of the lock 7 are shifted over the edges of the opening 21 to hold the lock 7 in the step cover 3. The step cover 3 is screwed with the 4 safety screws 9 into the corners of the step 2 opposite the full flat stepping area and the maintenance step 10 may be integrated by pivoting the step 2 into the fuselage of the helicopter 11 till the step cover is in flat alignment with the lateral shell.

Dismounting of the Maintenance Step 10

The step cover 3 is unscrewed, the retaining profile 5 unclipped, the two pins 4 are withdrawn one after the other towards the mid and the step 2 can be removed from the essentially rectangular casing 1.

Operation of the Maintenance Step 10

In its closed position the maintenance step 10 is held safely locked by projection 23 of the lock 7 projecting behind the abutment flange 28 in the essentially rectangular casing 1 riveted to the fuselage of the helicopter 11.

To open the maintenance step 10 an operator has to reach into the grip of the lock 7 and push the lock 7 down to release the projection 23 from behind the abutment flange 28 in the essentially rectangular casing 1 and pull out the step 2. The step 2 can be pivoted around the pins 4 in the bearings 6 to an open position until the inside of the step 2 abuts against overhang 16 in the lower part of the backside 13. In this open position an operator can step safely from above onto the step 2.

To close the maintenance step 10 an operator has to swing the step 2 upwards towards the lateral shell and push the inclined back of the projection 23 against the abutment flange 28 in order to slide the lock 7 down along the step cover 3 until the projection 23 can pass underneath the abutment flange 28. After passing the lock 7 is resiliently pushed back again for safe locking engagement of the projection 23 with the abutment flange 28. The maintenance step 10 is withheld safely in this closed position inside the lateral shell.

What is claimed is:

1. A method for mounting a maintenance step on a fuselage of a helicopter comprising:
    a casing, integrated into a lateral shell of the fuselage of the helicopter with access from outside; and
    a step being pivotably mounted in the casing;
    the casing being provided with an essentially rectangular frame and a rearward extension with lateral sides, the rearward extension with lateral sides being integrated into the lateral shell of the fuselage of the helicopter;
    the lateral sides have coaxial borings;
    the step being provided with corresponding coaxial borings in lateral flanges;
    two pins being provided for insertion through the corresponding coaxial borings into the coaxial borings in the lateral sides of the rearward extension for pivotable mounting of the step in the casing; and
    a retaining profile being provided for securing the inserted pins in their position; wherein said method comprises the following steps:
    inserting the rearward extension of the essentially rectangular casing of the maintenance step into the prepared fuselage of the helicopter;
    riveting the essentially rectangular frame of the casing flat against the lateral shell of the prepared fuselage of the helicopter;
    inserting pins from within a mid box through the corresponding coaxial borings into the coaxial borings in the lateral sides of the rearward extension;
    clipping the retaining profile into the grooves at the inwardly pointing ends of the inserted pins to fix the pins in their position; and
    screwing the step cover onto the step to fix the retaining profile relative to the grooves in its clipped position.

2. A method according to claim 1, wherein the step has an interface that is geometrically equivalent to the lateral shell.

3. A method according to claim 1, wherein a backside of the rearward extension is formed with an overhang.

4. A method according to claim 1, wherein a full flat stepping area with anti-skid painting is provided on the surface of the step.

5. A method according to claim 1, wherein a step cover is mounted to the step by at least one safety screw.

6. A method according to claim 5, wherein an opening is provided in the step cover for mounting of a lock to the step cover.

7. A method according to claim 1, wherein wear resistant bearings are provided for insertion into the borings of the lateral sides of the rearward extension of the casing.

8. A method according to claim 1, wherein washers are provided at the inside of the lateral sides and coaxially with the bearings.

9. A method according to claim 1, wherein mounting of bearings into coaxial borings in the lateral sides of the rearward extension of the essentially rectangular casing before insertion of the pins from within the mid box through the corresponding coaxial borings into the coaxial borings in the lateral sides of the rearward extension.

10. A method according to claim 9, wherein arranging washers on the inside of the lateral sides and coaxially with the bearings before insertion of the pins.

11. A method according to claim 1, wherein covering the surface opposite the full flat stepping area of step with a step cover screwed with safety screws.

12. A method for dismounting a maintenance step on a fuselage of a helicopter comprising:
    a casing, integrated into a lateral shell of the fuselage of the helicopter with access from outside; and
    a step being pivotably mounted in the casing;
    the casing being provided with an essentially rectangular frame and a rearward extension with lateral sides, the rearward extension with lateral sides being integrated into the lateral shell of the fuselage of the helicopter;
    the lateral sides have coaxial borings;
    the step being provided with corresponding coaxial borings in lateral flanges;
    two pins being provided for insertion through the corresponding coaxial borings into the coaxial borings in the lateral sides of the rearward extension for pivotable mounting of the step in the casing; and
    a retaining profile being provided for securing the inserted pins in their position; wherein said method comprises the following steps:
    unscrewing and removing the step cover from the step;
    taking a retaining profile out of the grooves at the inwardly pointing ends of the inserted pins;
    removing the pins from their positions in the coaxial borings; and
    taking the step out of the prepared fuselage of the helicopter.

13. A method according to claim 12, wherein the step has an interface that is geometrically equivalent to the lateral shell.

14. A method according to claim 12, wherein a backside of the rearward extension is formed with an overhang.

15. A method according to claim 12, wherein a full flat stepping area with anti-skid painting is provided on the surface of the step.

16. A method according to claim 12, wherein a step cover is mounted to the step by at least one safety screw.

17. A method according to claim 16, wherein an opening is provided in the step cover for mounting of a lock to the step cover.

18. A method according to claim 12, wherein wear resistant bearings are provided for insertion into the borings of the lateral sides of the rearward extension of the casing.

19. A method according to claim 12, wherein washers are provided at the inside of the lateral sides and coaxially with the bearings.

* * * * *